(No Model.)

D. S. TROY.
NUT LOCK.

No. 322,869. Patented July 21, 1885.

Witnesses:

Inventor:
Davd. S. Troy
By Wm. C. McIntire
Attorney

UNITED STATES PATENT OFFICE.

DANIEL S. TROY, OF MONTGOMERY, ALABAMA.

NUT-LOCK.

SPECIFICATION forming part of Letters Patent No. 322,869, dated July 21, 1885.

Application filed July 19, 1884. (No model.)

*To all whom it may concern:*

Be it known that I, DANIEL S. TROY, a citizen of the United States, residing at Montgomery, county of Montgomery, State of Alabama, have invented new and useful Improvements in Nut-Locks, of which the following is a specification.

My invention relates to certain new and useful improvements in nut-locks.

The object of the invention is to produce a lock which shall be simple and economic in construction, and be capable of securing a nut against being turned by ordinary jarring or strain, but which may be readily broken by the application of a wrench.

The invention consists of a nut having on its interior face a groove of peculiar form and having the fish-plate or other structure against which the nut rests provided with a series of radial grooves, with one of which the groove in the nut registers, forming a receptacle for a soft-metal plug when the nut is screwed in place.

In order that those skilled in the art to which my invention relates may know how to make and use my invention, I will now proceed to describe the same, in connection with the accompanying drawings, in which—

Figure 1:
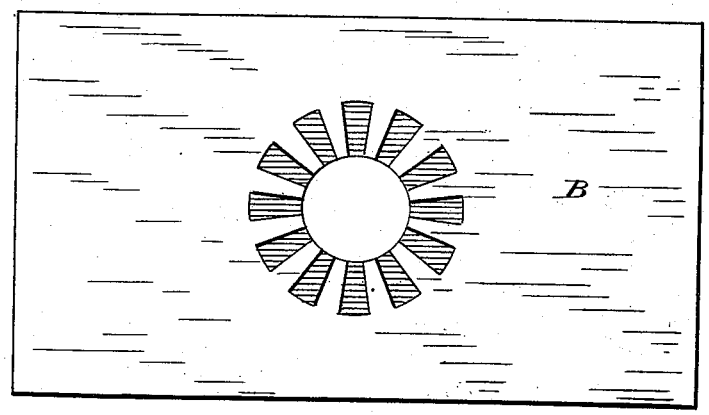
Figure 2:
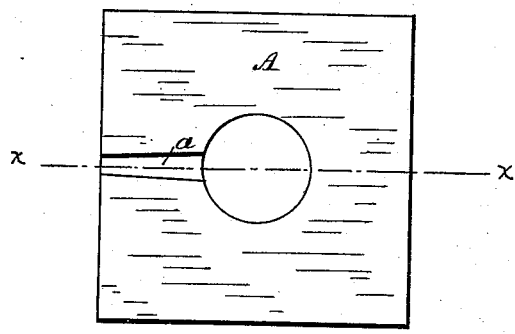
Figure 3:

Figure 1 is a side view of the fish-plate. Fig. 2 is a side view of the nut; and Fig. 3 is a section on line *x x* of Fig. 2.

In carrying out my invention I take an ordinary nut, A, and cut in one side thereof a groove, *a*. This groove is preferably made of the form shown in the drawings—that is, narrow and deep at its outside end and gradually increasing in width and decreasing in depth toward the other end, so that as a plug is driven in it is obliged to conform to the shape of the groove, and it becomes impossible to withdraw it, by reason of its being wider at its inner end. The fish-plate or other surface against which the nut bears is provided with a series of radiating grooves surrounding the bolt-hole and extending from the bolt-hole a short distance outward. These radiating grooves are, at the nut-hole, of the same diameter as the grooves in the nut, but they increase in diameter as they recede from the nut-hole, so as to leave the ridges between these radiating grooves of the same diameter from the bolt-hole to the end of the radiating grooves; and these ridges, between the radiating grooves on the fish-bar or other surface, are only half the diameter of the groove in the nut, so that when the nut is screwed down in any position the lower end of the groove in it cannot be entirely closed by one of the ridges between the radiating grooves in the fish-bar or other surface; and there is necessarily an open space leading from the groove in the nut to one or two of the grooves in the fish-bar or other surface, this space being at least equal to half the diameter of one of the grooves. Through this space the soft-metal plug inserted in the groove in the nut is forced into one or two of the grooves in the fish-bar or other surface. If the nut, when screwed down tight, stops at a point where the groove in the nut coincides with one of the radiating grooves in the fish-bar or other surface, the soft-metal pin driven through the groove in the nut enters the coinciding radiating groove in the opposite surface. If the nut, when screwed down tight, stops at a point where the groove in the nut coincides with one of the ridges in the opposite surface, the end of the soft-metal plug driven through the groove in the nut is divided by the coincident ridge in the opposite surface and enters the radiating grooves on each side of the ridge against which it is driven. The groove in the nut decreasing in depth toward the bolt-hole causes the inner end of the soft-metal plug, when driven in, to be deflected toward the opposite surface and to enter the radiating grooves, thus locking the nut.

The soft-metal plug is made of the same diameter as the outer end of the groove in the nut, and shaped so as to enter easily this groove. When the nut has been screwed down tight, the soft-metal plug is inserted in the groove in the nut, and by a plunger or other suitable device is driven in by one or more smart blows. Being thus driven, the inner end of the soft-metal plug is forced into one of the radiating grooves in the surface against which the nut rests; or, if the nut has rested where the groove in it is coincident to one of the ridges in the opposite surface, the lower end of the soft-metal plug is divided by the ridge, and the end of the soft-metal plug thus divided is forced into two of the radiating grooves in the opposite surface on each side of the ridge against which it is driven. After the soft-metal plug has been driven in, and its inner end forced into one of the radiating grooves in the opposite surface, the nut cannot be turned backward or forward without shearing off the end of the soft-metal plug, which projects into the radiating grooves in the opposite surface. The groove in the nut is made to increase in width from the edge of the nut to the bolt-hole, so that the soft-metal plug when driven in will spread laterally, and cannot be extracted without removing the nut, and the groove in the nut is made to decrease in depth in the same direction, so as to deflect the inner end of the soft-metal plug toward the opposite surface and into the radiating grooves therein. These radiating grooves or indentations around the bolt-hole in the fish-bar or other structure against which the nut bears are of the same width at the bolt-hole as the groove in the nut, and they extend outward from the bolt-hole a distance equal to about twice that width.

The plug is made of any metal which is softer than the material of which the nut is made—preferably lead or copper. When it is desirable to remove the nut locked in this way, it is only necessary to apply a wrench and exert sufficient strength to shear off the end of the soft-metal plug which has been driven into the radiating grooves of the opposite surface. The part of the plug remaining in the groove in the nut is no obstacle to unscrewing the nut, and when the nut is taken off the plug can be removed from the groove.

If the nut, by lengthening of the bolt or from other cause, becomes loose, a wrench can be used to screw it up tighter in the usual way. This will in like manner shear off the end of the soft-metal plug; but a movement of the nut equal to half the diameter of the groove will bring the inner end of the soft-metal plug opposite an opening into another of the radiating grooves in the opposite surface. The plunger or follower is again inserted in the groove in the nut, and one or two blows force the inner end of the soft-metal plug into the new space opened for it, thus locking the nut in its new position; and this may be done from time to time as the nut is screwed up, until the soft-metal plug is used up, or until all the radiating grooves in the opposite surface become filled with the sheared-off ends of it. When this occurs, the nut must be taken off, the soft metal in the grooves brushed out, and when the nut is replaced a new soft-metal plug must be used.

The nut may be provided with any suitable number of grooves for the reception of plugs commensurate with the strain to be imposed upon it; but I find that in ordinary cases one pin is sufficient to secure the nut in place.

Having thus described my invention, what I claim, and desire to secure by Letters Patent, is—

1. The nut provided with radiating grooves of greater width at their inner ends than at their outer ends, the fish-plate or the like, against which the nut bears, having grooves radiating from the bolt-hole, these latter grooves being at the bolt-hole of the same width as those in the nut, and widening as they extend outward, and the soft-metal plug, substantially as described.

2. The nut provided with one or more grooves on its inner face, which grooves gradually increase in width and decrease in depth from the outer to the inner end, the fish-plate provided with a groove or grooves and the soft-metal plug.

In testimony whereof I have hereunto set my hand in presence of two subscribing witnesses.

DANIEL S. TROY.

Witnesses:
W. C. BULLOCK,
JAMES JACKSON.